United States Patent [19]

Sasajima et al.

[11] Patent Number: 4,967,610

[45] Date of Patent: Nov. 6, 1990

[54] METHOD OF CONTROLLING SPEED REDUCTION RATIO FOR CONTINUOUSLY VARIABLE SPEED TRANSMISSION

[75] Inventors: Koji Sasajima, Tokyo; Kouji Yamaguchi, Saitama, both of Japan

[73] Assignee: Honda Giken Kogyo Kabushiki Kaisha, Tokyo, Japan

[21] Appl. No.: 259,834

[22] Filed: Oct. 19, 1988

[30] Foreign Application Priority Data

Oct. 19, 1987 [JP] Japan .................. 62-263056
Dec. 18, 1987 [JP] Japan .................. 62-320172
Dec. 18, 1987 [JP] Japan .................. 62-320173

[51] Int. Cl.⁵ .......................................... B60K 41/12
[52] U.S. Cl. ................................ 74/866; 364/424.1
[58] Field of Search ..................... 74/866; 364/424.1

[56] References Cited

U.S. PATENT DOCUMENTS

| 4,253,347 | 3/1981 | Mizuno et al. ............... 74/866 X |
| 4,291,594 | 9/1981 | Baudoin ........................ 74/857 |
| 4,561,327 | 12/1985 | Niwa et al. ................ 364/424.1 X |
| 4,641,553 | 2/1987 | Kobayashi ...................... 74/866 |
| 4,653,007 | 3/1987 | Osanai et al. ............... 364/424.1 |
| 4,663,990 | 5/1987 | Itoh ............................... 74/866 |
| 4,701,853 | 10/1987 | Osanai ...................... 364/424.1 |
| 4,704,683 | 11/1987 | Osanai ...................... 364/424.1 |
| 4,730,522 | 3/1988 | Morimoto ..................... 74/866 X |
| 4,750,598 | 6/1988 | Danno ......................... 192/0.058 |
| 4,753,133 | 6/1988 | Itoh ............................... 74/866 |
| 4,793,217 | 12/1988 | Morisawa ....................... 74/866 |

FOREIGN PATENT DOCUMENTS

| 0168540 | 1/1986 | European Pat. Off. . |
| 0207231 | 1/1987 | European Pat. Off. . |
| 0217221 | 4/1987 | European Pat. Off. . |
| 0240178 | 10/1987 | European Pat. Off. . |
| 2363762 | 6/1975 | Fed. Rep. of Germany . |
| 343954 | 5/1985 | Fed. Rep. of Germany . |
| 58-191360 | 11/1983 | Japan . |
| 60-95263 | 7/1985 | Japan . |
| 61-207229 | 9/1986 | Japan . |
| 62-237164 | 10/1987 | Japan . |

Primary Examiner—Dirk Wright
Attorney, Agent, or Firm—Lyon & Lyon

[57] ABSTRACT

A method of controlling speed reduction ratio comprises the following steps: determining "EB-REF-engine speed" which is higher than "R-REF-engine speed" when the accelerator opening is substantially closed and the vehicle brake is applied simultaneously, and controlling speed reduction ratio so that the actual engine speed coincides with the EB-REF engine speed. Although the above method also comprises the following steps as a normal ratio control: setting the R-REF engine speed in relation to the accelerator opening, and controlling speed reduction ratio so that the actual engine speed coincides with the R-REF engine speed.

8 Claims, 7 Drawing Sheets

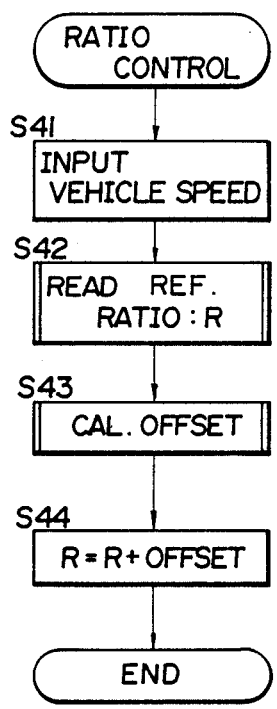
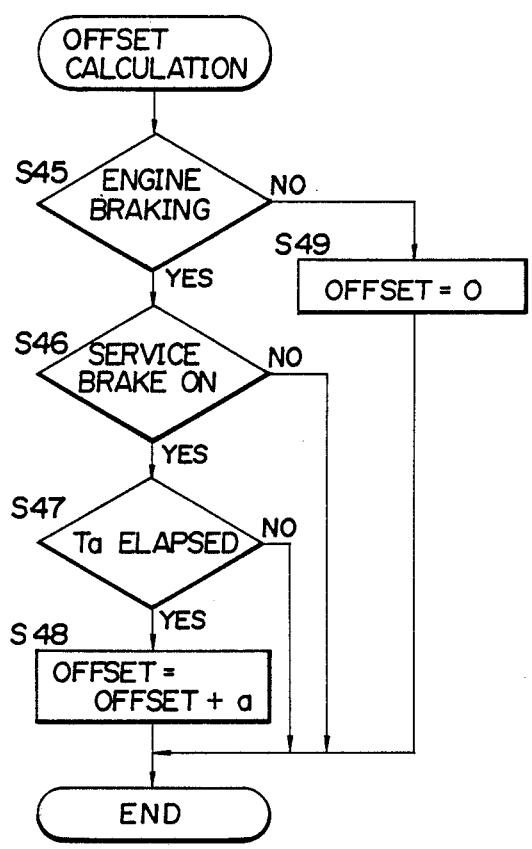

METHOD OF CONTROLLING SPEED REDUCTION RATIO FOR CONTINUOUSLY VARIABLE SPEED TRANSMISSION

BACKGROUND OF THE INVENTION

The present invention relates to a method of controlling a speed reduction ratio for a vehicle having a continuously variable speed transmission.

A controlling method of the speed reduction ratio for a vehicle provided with a continuously variable speed transmission, wherein a reference engine speed is predetermined in accordance with engine throttle opening, and then the speed reduction ratio is so controlled that the actual engine speed coincides with said reference engine speed, is known in the Japanese Patent laid-open publication No. 62(1987)-237164.

When a vehicle equipped with such a continuously variable speed transmission is decelerated by closing the accelerator opening with the accelerator pedal released, the reference engine speed corresponding to the accelerator opening is low, and therefore the engine brake will not function effectively. When it becomes necessary to decelerate the vehicle by releasing the accelerator pedal to close the accelerator opening and by applying vehicle brakes simultaneously, it is desirable to make use of the engine brake function effectively along with the vehicle brake to improve braking characteristics. However, the above-described speed reduction ratio control may not be able to utilize enough engine brake.

In many vehicles equipped with a continuously variable speed transmission, a shift lever is installed whereby a vehicle running speed is controlled by positioning it to either the "D" or "L" range. Ordinarily, in the "L" range is set a higher reference engine speed than in the "D" range, and in each range the speed reduction ratio is so controlled that the actual engine speed coincides with the reference speed.

When a vehicle is being decelerated by releasing the accelerator pedal and closing the accelerator opening (which corresponds to either the engine throttle opening or the accelerator pedal depression) to almost zero, the reference engine speed is set corresponding to such closed accelerator opening. The engine brake is more effective during running in the "L" range where higher reference engine speed is set than during running in the "D" range where a lower reference engine speed is set.

When decelerating a vehicle by removing a foot from the accelerator pedal to close the accelerator opening to almost zero and by applying the vehicle brakes at the same time, it is preferable to utilize the engine brake effectively, as mentioned previously, in combination with the vehicle brake to shorten a brake distance. With a vehicle running with the shift lever positioned at "D", however, the engine brake force is small as mentioned above when the vehicle is decelerated by releasing the accelerator pedal, and consequently the effect of the engine brake will not be effective in reducing the brake distance.

It is conceivable that, when a need arises to apply the vehicle brake while running in the D-range, the shift lever may be shifted to the L-range position by a driver to obtain a greater engine brake force, but such manual shifting often results in delayed timing, and may not practically make the engine brake force supplement the vehicle brake for an immediate deceleration.

As a ratio control method of the continuosly variable speed transmission whereby the vehicle is decelerated by taking advantage of the engine brake function, it is known to automatically reduce the speed reduction ratio when the engine brake functions. Also known is a method whereby the speed reduction ratio is so changed that the engine brake potential is varied in relation with the running speed of vehicle, as disclosed in the Japanese Patent Laid-open Publication No. 60(1985)-95263.

With such an automatic ratio control or a vehicle-speed-related ratio control, the engine brake potential is determined solely by the running state of the vehicle. Consequently, the driver may obtain only a uniform predetermined amount of engine brake force when decelerating from the same speed at which he runs the vehicle, irrespective of the driver's desire to decelerate the vehicle by utilizing stronger engine brake force. His only choice for further deceleration will be to depress more strongly the brake pedal to increase the effect of the vehicle brake. Thus, the controlling method of the engine brake force by means of a conventional ratio control can not provide any means of response that follows closely the desires of the driver.

SUMMARY OF THE INVENTION

The object of the present invention is to provide a speed reduction ratio control method whereby a driver, by releasing an accelerator pedal to reduce an accelerator opening to zero and by simultaneously applying a vehicle brake, may obtain enough engine brake force.

It is another object of the invention to provide a ratio control method whereby a vehicle running in a "D" range may obtain greater engine brake force when vehicle brakes are applied.

It is further object of the present invention to provide a ratio control method whereby the brake requirements of the driver are judge from a manner in which the driver is operating the vehicle brake, and the engine brake force is variably adjusted in response to the braking demands of the driver.

As a means to attain such objects, a first speed reduction ratio controlling method of this invention comprises the following steps: determining engine-brake reference engine speed (referred to as "EB-REF-engine speed" hereinafter) which is higher than the running reference engine speed (referred to as "R-REF-engine speed" hereinafter) corresponding to the accelerator opening when the accelerator opening is closed to almost zero and the vehicle brake is applied simultaneously, and controlling speed reduction ratio so that the actual engine speed coincides with the EB-REF engine speed. Although the above method also comprises the following steps as a normal ratio control: setting the R-REF engine speed in relation to the accelerator opening, and controlling speed reduction ratio so that the actual engine speed coincides with the R-REF engine speed. When the two ranges "D" and "L" are provided, the R-REF engine speed comprises the D-range R-REF engine speed arranged with the "D" range, and the L-range R-REF engine speed which is set at greater speed than said D-range R-REF engine speed. In this case, the L-range R-REF engine speed corresponding to the accelerator opening of almost zero can be used as a EB-REF engine speed. Therefore, speed reduction ratio is so controlled that the actual engine speed coincides with the L-range R-REF engine speed which is the same as the EB-REF engine speed, when the accelerator opening is closed to almost zero and the vehicle brake is applied while running in the D-range.

The second control method of this invention comprises controlling speed reduction ratio continuously based on either one of the following modes;

(A-1) the D-range running mode, which is chosen in D-range position of shift lever with accelerator opening being opened, wherein speed reduction ratio is so controlled that actual engine speed coincides with the D-range R-REF engine speed corresponding to the accelerator opening;

(A-2) the D-range engine-brake mode, which is chosen in D-range position of the shift lever with the accelerator opening being almost closed, wherein speed reduction ratio is so controlled that actual engine speed coincides with the D-range EB-REF engine speed which is higher than the D-range R-REF engine speed;

(B) the L-range mode, which is chosen in L-range position of the shift lever, wherein the speed reduction ratio is so controlled that actual engine speed coincides with the L-range reference engine speed, which is higher than the D-range R-REF engine speed and is set to correspond with the accelerator opening;

wherein, when the shift lever is positioned in the "D" range while the accelerator opening is reduced to almost zero and the vehicle brake is applied, the L-range mode will be selected irrespective of the shift position, and the speed reduction ratio will be controlled based on this mode.

Furthermore, the L-range mode may comprise, (B-1) the L-range running mode, which is chosen in L-range position of the shift lever with the accelerator opening being opened, wherein the speed reduction ratio is so controlled that actual engine speed coincides with the L-range R-REF engine speed, which is higher than the D-range R-REF engine speed; and (B-2) the L-range engine-brake mode, which is chosen in L-range position with the accelerator opening being almost closed, wherein the speed reduction ratio is so controlled that actual engine speed coincides with the L-range EB-REF engine speed, which is higher than the L-range R-REF engine speed. And when the accelerator opening is closed to almost zero and the vehicle brake is applied with the shift lever positioned in "D" range, the L-range engine-brake mode may be selected and the speed reduction ratio may be controlled based on this mode.

The third speed reduction ratio control method of this invention comprises the steps of: cumulatively calculating the vehicle brake operating time while the vehicle is decelerated with the accelerator opening closed almost to zero to utilize the engine brake function, and correcting speed reduction ratio to increase corresponding to said cumulative time, so that the longer the driver applies the vehicle brake, the greater the engine brake effect is.

The wordings "accelerator opening" used in the specification and claims means an accelerator pedal opening operated dependent upon the driver's accelerating or decelerating intention or an engine throttle valve opening responsive to the operation of an accelerator pedal. The accelerator opening is fully closed when the accelerator pedal is completely released and fully opened when it is completely depressed.

Further scope of the applicability of the present invention will become apparent from the detailed description given hereinafter. However, it should be understood that the detailed description and specific example, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

FIGS. 8 and 9 are flow charts illustrating a control method of a third embodiment of the invention.

DETAILED DESCRIPTION OF THE PREFERRED EMBODIMENTS

Figure 1:
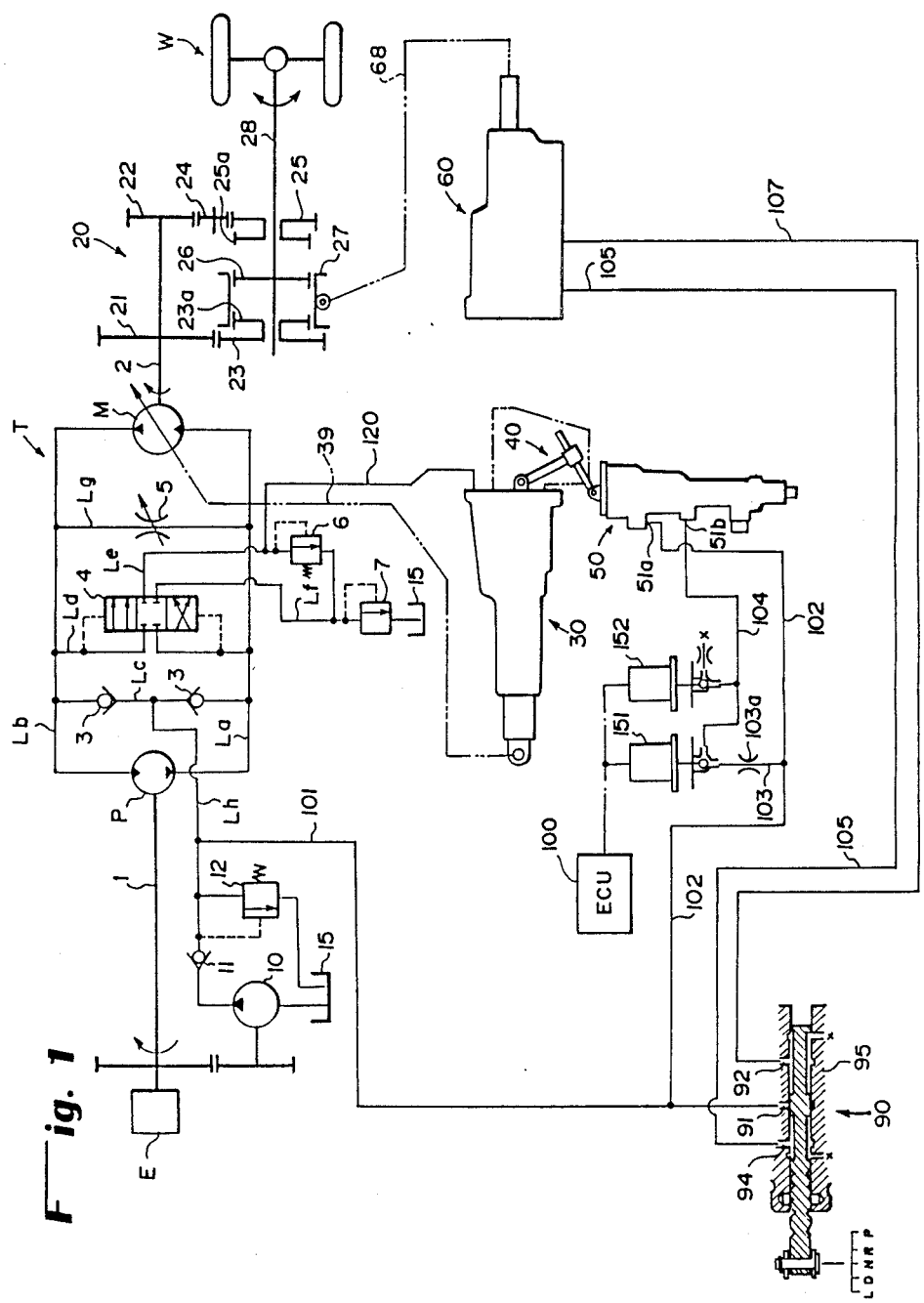
FIG. 1 is a hydraulic circuit diagram of a continuously variable speed transmission whose speed reduction ratio is controlled by a method of this invention.

A hydraulic circuit diagram of a continuously variable speed transmission with a direct clutch unit in accordance with the present invention is presented in FIG. 1 wherein the continuously variable speed transmission T has a constant displacement swash plate type axial plunger hydraulic pump P driven by an engine E through an input shaft 1 and a variable displacement swash plate type axial plunger hydraulic motor M which drives wheels W through a directional change unit 20. The pump P and motor M are connected with each other by means of two hydraulic lines La and Lb composing a closed hydraulic circuit wherein the first line La connects the pump inlet port to the motor outlet port and the second line Lb connects the pump outlet port to the motor inlet port.

A charge pump 10 driven by the engine E is connected to the closed circuit through a charge hydraulic line Lh having a check valve 11 and through a third hydraulic line Lc having a pair of check valves 3 and 3. Hydraulic oil pumped up by the charge pump 10 from an oil sump 15 and regulated in its pressure by a charge pressure relief valve 12 is supplied to either of the two hydraulic lines La, Lb which has lower pressure through the check valves 3, 3. A fourth hydraulic line Ld having a shuttle valve 4 is connected to the closed circuit. To the shuttle valve 4 is connected a fifth and a sixth hydraulic line Le and Lf which respectively have a high pressure relief valve 6 and a low pressure relief valve 7 with outlets to the oil sump 15. The shuttle valve 4 is a 2-port 3-position selector valve, which is operated in response to a hydraulic pressure difference of the first and second hydraulic lines La and Lb to shift to either of the extreme positions to connect either of the first or second hydraulic lines La, Lb having higher pressure with the fifth hydraulic line Le as well as to connect the other hydraulic line La or Lb having lower pressure with the sixth hydraulic line Lf. Therefore, the relief pressure of a higher pressure line is regulated by the high pressure relief valve 6, and the relief hydraulic pressure of the other lower pressure line is regulated by the low pressure relief valve 7. When the pressures in hydraulic lines La and Lb are equal, the valve 4 is in the central position for closing the line Ld.

Between the first and second hydraulic lines La and Lb is provided a seventh hydraulic line Lg to short-cut circuit (i.e., short-circuit) between the both lines. The seventh hydraulic line Lg is provided with a clutch valve 5, which is a variable opening control valve to control the opening degree of the line.

An output shaft 28 connected to the wheels W is placed in parallel with the drive shaft 2 of the hydraulic motor M. A directional change gear unit 20 is placed between these two shafts 2,28. This gear unit 20 comprises a first and a second drive gear 21,22 firmly mounted on the drive shaft 2 leaving an axial space therebetween, a first driven gear 23 rotatably mounted on the output shaft 28 and engaged with the first drive gear 21, a second driven gear 25 rotatably mounted on the output shaft 28 and engaged with a intermediate gear 24 which is engaged with the second drive gear 22, a clutch hub 26 placed between the first and second driven gears 23, 25 and firmly mounted on the output shaft 28, and a sleeve 27 slidably mounted on the clutch hub 25 which can be selectively engaged with the clutch gears 23a, 25a formed on the sides of the driven gears 23, 25. In the directional change gear unit 20, when the sleeve 27 is slided leftward, the clutch gear 23a of the first driven gear 23 is connected to the clutch hub 25 by means of the sleeve 27 (as shown in FIG. 1). Hence the rotational direction of the output shaft 28 is opposite to that of the drive shaft 2 and the wheels W are driven forward by the continuously variable speed transmission T. On the other hand, when the sleeve 27 is slided rightward, the clutch gear 25a of the second driven gear 25 is connected to the clutch hub 26 by means of the sleeve 27. Hence, the rotational direction of the output shaft 28 is the same as that of the drive shaft 2 and the wheels W are driven rearward.

In the FIG. 1, with the directional change gear unit 20, the directional control servo unit 60 acts as an actuator to axially move the sleeve 27 for directional control of the vehicle. The first and second ratio control servo units 30 and 50 connected with each other by the link mechanism 40 the control speed reduction ratio of the continuously variable speed transmission T by controlling the displacement of the hydraulic motor M. The hydraulic motor M is a swash plate type axial piston motor of which displacement is controlled through its swash plate angle by the servo units 30 and 50. The clutch valve 5 is operationally controlled by the clutch servo unit which is not shown in the drawings.

The operation of the ratio control servo units 30 and 50 is controlled by the solenoid valves 151 and 152 which in turn are duty-ratio controlled by signals transmitted from the controller 100. The controller 100 receives signals corresponding to a vehicle speed V, an engine speed Ne, a throttle opening degree $\theta$th, accelerator pedal opening degree $\theta$acc, a swash plate tilt angle $\theta$tr, a manual shift lever position Ps1, and a brake operative status, and transmits such signals as to control the respective solenoid valves of the above functions to effectuate desirable traveling characteristics.

The directional control servo unit 60 is controlled by hydraulic fluid fed from a manual valve 90 which is operated by the shift lever.

The structures and operations of the above servo units 30, 50 and 60 are described in detail below.

Figure 2:
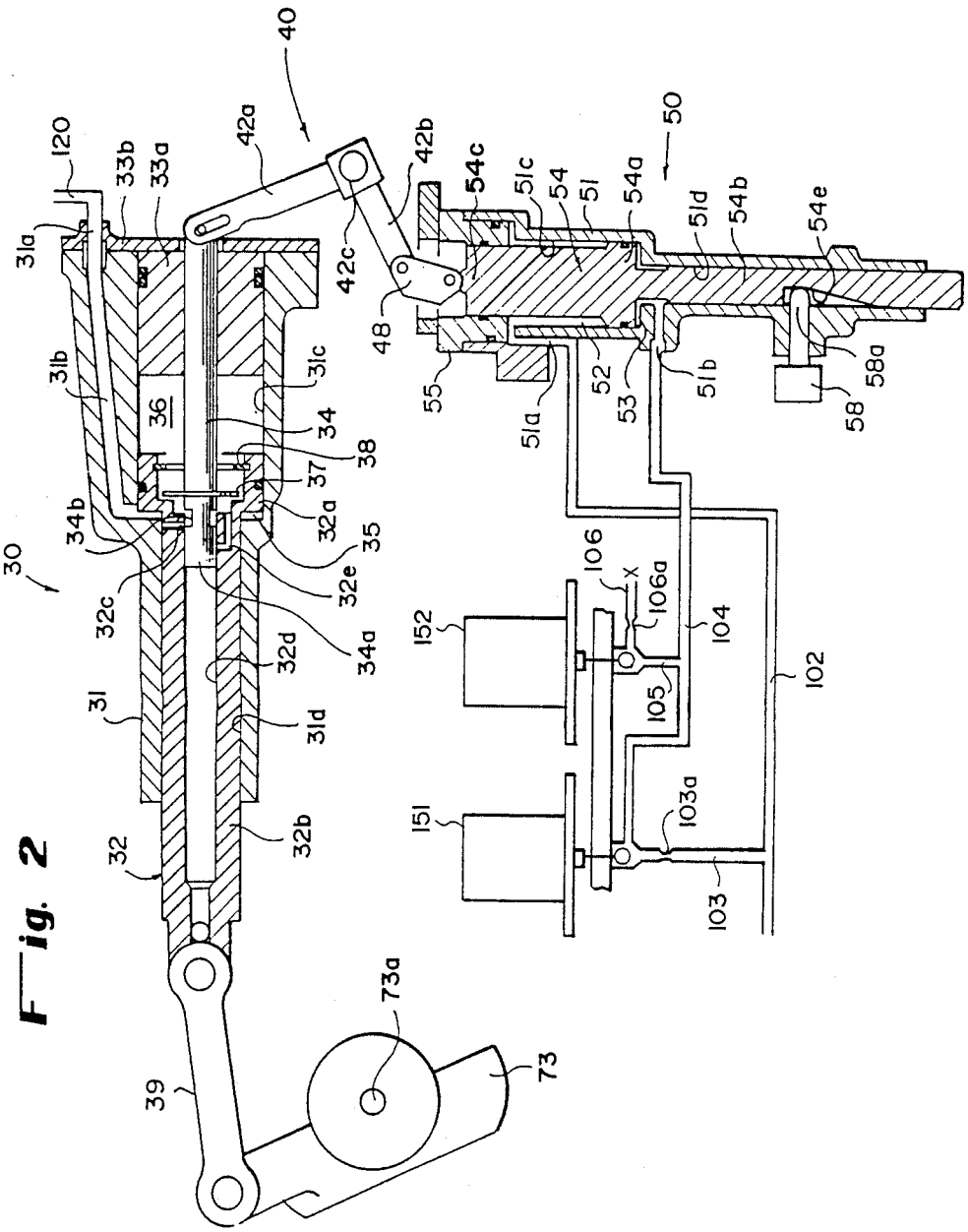
FIG. 2 is a sectional view of a first and second speed reduction servo unit.

Referring first to the ratio control servo unit 30, 50 shown in FIG. 2, the first ratio control servo unit 30 controls the swash plate angle of the hydraulic motor M by the help of the high hydraulic pressure fed from the closed hydraulic circuit of the transmission T through the shuttle valve 4, the fifth line Le and a high pressure line 120. The second ratio control servo unit 50 is connected to the first ratio control servo unit 30 by a link mechanism 40 and controls the operation of the first ratio control servo unit 30.

The first ratio control servo unit 30 comprises a housing 31 having a connection port 31a connected to the high pressure line 120, a piston member 32 slidably inserted into the housing 31, and a spool member 34 slidably and coaxially inserted into the piston member 32. The piston member 32 consists of a piston portion 32a formed at its right end and a rod portion 32b coaxially extending leftward. The piston portion 32a is fitted into a cylinder hole 31c of the housing 31 and divides the space inside the cylinder hole 31c into two chambers defining two cylinder chambers 35, 36. The rod portion 32b having a smaller diameter than that of the cylinder hole 31c is inserted into a rod hole 31d which is concentric with the cylinder hole 31c. The right cylinder chamber 36 is covered by a plug member 33a and cover 33b through which the right end of the spool member 34 protrudes.

The high pressure line 120 connected to the port 31a is communicated with the left cylinder chamber 35 through a hydraulic line 31b. The piston member 32 is pushed rightward by the hydraulic pressure fed in the left cylinder chamber 35 through the high pressure line 120.

A land portion 34a which is inserted in a spool hole 32d is formed at the left end of the spool member 34. A pair of dents 34b with fixed axial widths is formed at the right side of the land portion 34a. A stop ring 37 mounted on the spool member 34 hits against a stop ring 38 mounted on the inside surface of the piston member 32 before the spool member 34 comes out.

A drain passage 32e which can connect the right cylinder chamber 35 to the oil sump (not shown) through the spool hole 32d responding to the rightward motion of the spool member 34 and a connection passage 32c which can connects the left cylinder chamber 35 to the right cylinder chamber 36 through the dents 34b responding to the leftward motion of the spool member 34 are formed in the piston member 32.

When the spool member 34 is moved rightward, the land portion 34a blocks the connection passage 32c and opens the drain passage 32e. Accordingly the hydraulic pressure fed through the high pressure line 120 is led in the left cylinder chamber 35 and pushes the piston member 32 rightward so that the piston member 32 follows the spool member 34. When the spool member 34 is moved leftward, the connection passage 32c is communicated with the right cylinder chamber 36 through the dents 34b and the drain passage 32e is blocked by the land portion 34a. Accordingly the high hydraulic pressure is fed to both the left and right cylinder chambers 35, 36. The piston member 32 is pushed leftward because of the difference in areas where pressure applied and therefore the piston member 32 is moved so as to follow the spool member 34.

When the spool member 34 is held still, the piston member 32 is also held still creating a hydraulically balanced state because of pressure balance between the left and right cylinder chambers 35, 36.

As discussed, when the spool member 34 is moved leftward or rightward, the piston member 32 is moved laterally so as to follow the spool member 34 with the help of the high hydraulic pressure fed through the high pressure line 120. Accordingly the variable displacement of the motor M is controlled by the motion of the spool member 34 since the piston member 32 is connected to the swash plate 73 of the motor M by means of a link member 39.

The spool member 34 is linked to the second servo unit 50 by means of a link mechanism 40. The link mechanism 40 includes a first link member 42 being swingable around an axis 42c and having two arms 42a and 42b perpendicular to each other, and a second link member 48 pivotally connected to the arm 42b. The upper end of the arm 42a is pivotally connected to the right end of the spool member 34. The bottom end of the second link member 48 is pivotally connected to a spool member 54 of the second servo unit 50. Therefore when the spool member 54 of the second servo unit 50 is moved up or down, the spool member 34 of the first servo unit 30 is moved rightward or leftward.

The second servo unit 50 comprises a housing 51 having ports 51a, 51b to which hydraulic lines 102, 104 are connected respectively, and the spool member 54 vertically slidably fitted in the housing 51. The spool member 54 consists of a piston portion 54a, and end spool portion 54b coaxially extending downward and a rod portion 54c coaxially extending upward therefrom. The piston portion 54a is inserted into a cylinder hole 51c of the housing 51 and divides the space inside the cylinder hole 51c covered by a cover 55 into two chambers defining an upper and a lower cylinder chamber 52, 53. The end spool portion 54b is inserted into a rod hole 51d which is concentric with the cylinder hole 51c and extends downward.

A spool 58a of a top position detecting switch 58 is projected into a recess 54e formed on the end spool portion 54b. The spool 58a is pushed up along the tapered surface of the recess 54e when the spool member 54 is moved up. Therefore it can be found by the top position detecting switch 58a if the speed reduction ratio has become minimum since the pushed-up spool 58a turns the switch 58 on.

Further, the hydraulic lines 102, 104 are communicated with the upper and lower cylinder chambers 52, 53 through the ports 51a, 51b. The spool member 54 is moved up or down by the difference of hydraulic forces applied to the piston portion 54a which are determined based on the differences of hydraulic pressures and of areas where the hydraulic pressures in the cylinder chambers 52, 53 are applied. The up and down motions of the spool member 54 are transmitted to the spool member 34 of the first servo unit 30 by the link mechanism 40 causing right and left motions of the spool member 34. In other words, the control of the hydraulic pressures supplied through the hydraulic lines 102, 104 enables of control the motion of the spool member 34 and the piston member 32 in the first servo unit 30 and also enables control of the swash plate angle of the hydraulic motor M and the displacement thereof. In fact, when the spool member 54 of the second servo unit 50 is moved up, the piston member 32 of the first servo unit 30 is moved rightward lessening the swash plate angle, the displacement of the hydraulic motor M and the speed reduction ratio.

As shown in FIG. 1, hydraulic oil the pressure of which is regulated by the charge pressure relief valve 12 is led to the hydraulic line 102 through a hydraulic line 101. Hydraulic oil in the hydraulic line 102 is led to the hydraulic line 104 through a hydraulic line 103 having an orifice 103a, and the hydraulic pressure in the hydraulic line 104 is controlled by the two solenoid valves 151, 152 which are operated based on duty cycle signals from the controller 100. Accordingly it is said that the signals from the controller 100 control the operations of the first and second servo units 30, 50 and consequently adjust the displacement of the hydraulic motor M.

Figure 3:
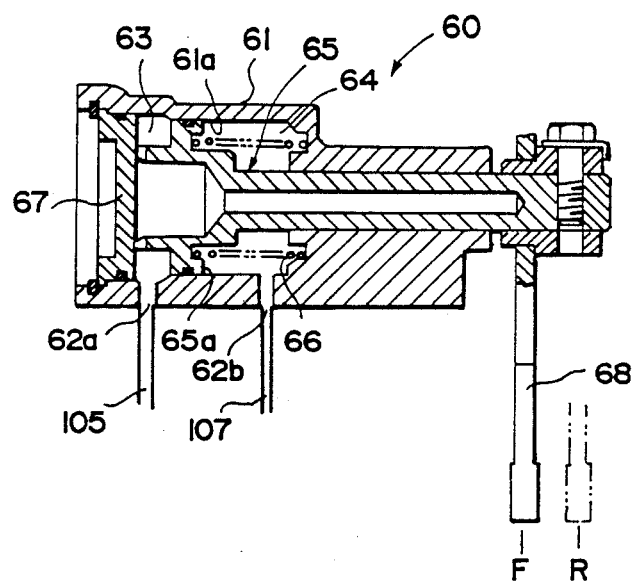
FIG. 3 is a sectional view of a directional control servo unit.

Referring next to the construction of FIG. 3: The directional control servo valve 60 comprises a housing 61 and a spool member 65. The housing 61 has two ports 62a, 62b to which the lines 105, 107 as shown in FIG. 1 are connected respectively. The spool member 65 consists of a piston portion 65a and a rod portion 65b coaxially extending rightward.

The piston portion 65a is laterally and slidably inserted into a cylinder hole 61a of the housing 61 and divides the room inside the cylinder hole 61a covered by a cover 67 into two regions defining a left and a right cylinder chamber 63, 64. The rod portion 65b is inserted into a rod hole 61b which is concentric with the cylinder hole 61a and extends rightward. The right end of the rod portion 65b extends outward from the right side of the housing 61. A shift fork 68 which can move the sleeve 27 of the directional change unit laterally is fixed to the right end of the rod portion 65b.

The spool member 65 is pushed leftward by a spring 66 placed in the right cylinder chamber 64.

The directional control servo valve 60 is actuated by the hydraulic pressure fed to the left or right cylinder chamber 63, 64 through either of the hydraulic lines 106, 107 according to the action of the manual valve 90. The hydraulic line 106 is connected to the reverse side port 94 of the manual valve 90. The hydraulic line 107 is connected to the forward side port 92 of the manual valve 90. The spool 95 of the manual valve 90 is moved in accordance with the actuation of the manual shift lever placed in the driver's compartment. When the shift lever is positioned at "D" or "L", the inlet port 91 communicates with the forward side port 92. When the shift lever is positioned at "R", the inlet port 91 communicates with the reverse side port 94.

The inlet port 91 communicates with the charge line Lh which has the hydraulic pressure regulated by the charge pressure relief valve 12. When the shift lever is positioned at the "D" or "L" position, the reverse side port 94 communicates with a drain port and the forward side port 92 communicates with the inlet port 91. Then the hydraulic oil in the left cylinder chamber 63 is exhausted through the drain port and the hydraulic oil from the charge line Lh is supplied into the right cylinder chamber 64. Accordingly the hydraulic pressure in the right cylinder room 64 pushes the spool member 65 and the shift fork 68 leftward, and therefore the sleeve 27 is moved to the forward position in the directional change unit 20 (see FIG. 1).

When the shift lever is moved to a "N" position, the inlet port 91 is closed and the other ports 92 and 94 communicate with the drain ports as shown in FIG. 1.

Therefore the hydraulic pressures in the left and the right cylinder chambers 63, 64 become "zero". However the spool member 65 is kept at the left position by the biasing force of the spring 66 and accordingly the sleeve 27, of the directional change unit 20 is kept at the forward position.

When the shift lever is moved to a "R" position, the inlet ports 91 communicates with the reverse side port 94 and the ports 92 communicates with the drain ports. Therefore the hydraulic oil having the charge pressure from the charge line Lh is directed to the left cylinder chamber 63 but the right cylinder chamber 64 still communicates with the drain port. The spool member 65 and the shift fork 68 are pushed rightward by the charge pressure in the left cylinder chamber 63 and accordingly the sleeve 27 of the directional change unit 20 is moved to the reverse position.

Further, the shift lever position is detected by a position sensor. The signal Psl which represents the detected lever position is sent from the position sensor to the controller 100. Therefore control suitable for each lever position is conducted by the controller 100.

Figure 4:
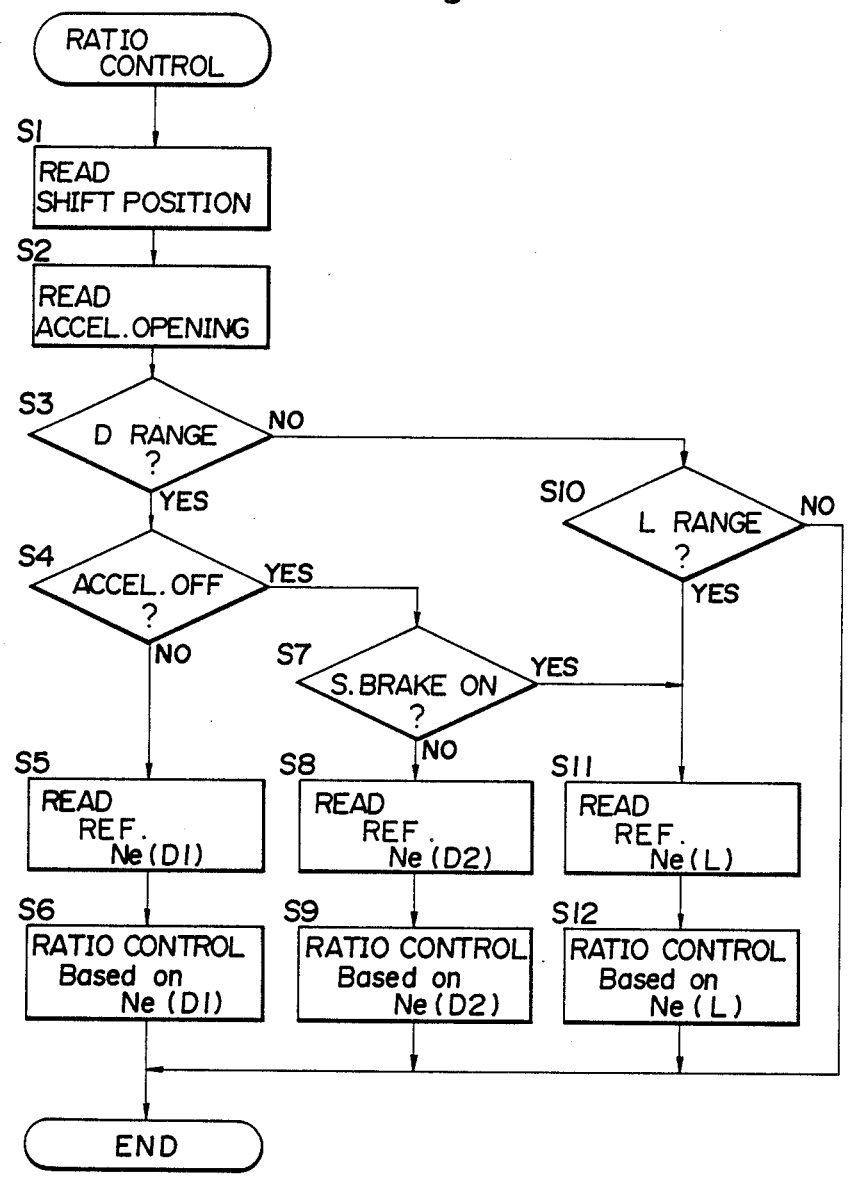
FIGS. 4 and 6 are, respectively, flow-charts explaining methods of a first and a second embodiment of the invention.

The first embodiment of the controller 100 of the continuously variable speed speed reduction is described with the flow chart of FIG. 4:

At first, the description refers to the case where the shift lever position read at Step S1 is "D" and the accelerator opening read at Step S2 is not "off", or in other words, where the vehicle is started to run by depressing the accelerator pedal. In this case, when the accelerator pedal is depressed to increase the engine speed and the vehicle speed, the control goes to Steps S5, S6. The controller 100 selects a D-range running mode. After the clutch 5 is engaged, the speed reduction ratio is so controlled that the actual engine speed follows the D-range R-REF (running reference) engine speed Ne(D1) which is set according to the accelerator opening. As a result, the vehicle speed is increased in response to the depression of the accelerator pedal. As the chart of FIG. 5 specifically indicates, the control is executed to change the speed of the vehicle according to the sequence of L1 (engagement of the main clutch) to L2 (increasing the vehicle speed by increasing the engine speed at the maximum speed reduction ratio) to L3 (acceleration by decreasing the speed reduction ratio while keeping the actual engine speed in agreement with the D-range R-REF engine speed) to L4 (increasing the vehicle speed by increasing the engine speed at the minimum speed reduction ratio).

Figure 5:
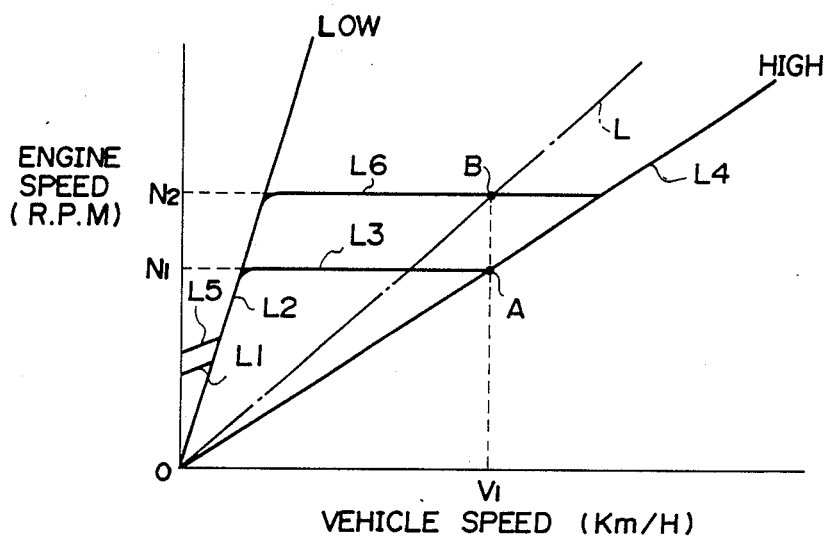
FIGS. 5 and 7 are graphs illustrating control functions of the continuously variable speed reduction in relation with engine and vehicle speed.

In case of running the vehicle with the shift lever at "L" position (S10), proceed to Steps S11 and S12 where the controller 100 selects a L-range running mode, and a L-range R-REF engine speed Ne(L) is read in relation with the accelerator opening. The speed reduction ratio is so controlled that the actual engine speed coincides with the L-range R-REF speed Ne(L). The L-range R-REF engine speed Ne(L) is set to a greater value than the D-range R-REF engine speed Ne(D1), and therefore when the accelerator pedal is depressed, the variation in the vehicle speed and the engine speed will follow, as shown in the chart of FIG. 5, in the sequence of: L5 (engagement of the main clutch) to L2 (increasing the vehicle speed by increasing the engine speed at the maximum speed reduction ratio) to L6 (acceleration by decreasing the speed reduction ratio while keeping the actual engine speed in agreement with the D-range R-REF engine speed) to L4 (increasing the vehicle speed by increasing the engine speed).

The variation shown in the FIG. 5 is only an example, and when accelerator opening is varied different variation will result because of the difference in the reference engine speed.

If the shift lever is shifted to the L-range during running in the D-range at a speed Vl and a reference engine speed N1 (which is the D-range R-REF engine speed) as indicated in the point A, the reference engine speed will be increased to N2 (which is the L-range R-REF engine speed) and the speed reduction ratio is reduced to the point B (the ratio corresponding to line L).

Above is the description of the ratio control in accordance with the accelerator opening varied by depression of the accelerator pedal in either D or L-range. The following are cases where a vehicle is decelerated with releasing the accelerator pedal and closing the accelerator opening substantially.

When the accelerator opening is substantially closed, the reference engine speed corresponding to such opening is set (S8) to execute the speed reduction ratio control by making the actual engine speed coincide with the reference engine speed (S9). The reference engine speed is set correspondingly to the running ranges, and therefore the reference engine speed at the L-range is set to higher value than that of the D-range. The engine brake potential at the accelerator opening of approximately zero, therefore, is greater in the L-range than in the D-range.

The control method of this invention, on the other hand, is so arranged that, during deceleration with the shift lever being in the D-range and the accelerator opening being substantially closed, if the vehicle brake is applied by depressing the brake pedal, the control is moved from Step S7 to S11. At this time, the controller 100 selects the L-range mode, although the shift lever remains in the D-range, to set the L-range R-REF engine speed corresponding to the accelerator opening as an EB-REF (engine-brake reference) engine speed of this time. Consequently, during running with the shift lever positioned at the D-range, when the accelerator pedal is released and the brake pedal is depressed, the engine-brake force as great as that in the L-range mode can be effectuated, and therefore a shorter brake distance can be effectuated.

A control method may be arranged whereby once the vehicle brake pedal is depressed, the controller 100 will keep selecting the L-range mode unless the accelerator pedal is depressed again. This method will not only provide a great brake force by combined use of the vehicle brake and engine brake, but also make it possible to decelerate the vehicle using only the engine brake by releasing the brake pedal after the vehicle brake has been depressed.

The above embodiment described an example in which the reference engine speed corresponding to the accelerator opening of approximately zero at the L-range is used as the L-range EB-REF engine speed. It is not however necessary to limit the L-range EB-REF engine speed to that specific speed. It is also possible to set the engine speed, which is higher than the D-range reference engine speed corresponding to the accelerator opening of approximately zero in the D-range, separately as the L-range EB-REF engine speed. If speed reduction ratio is controlled based on the L-range EB-REF engine speed, a great engine brake force can be obtained when the accelerator opening is substantially closed and the vehicle brake of the vehicle is applied simultaneously.

Although above-described embodiment referred to the ratio control in a transmission provided with both the D-range and L-range, the same principle may be applied to a transmission which has only one range (D-range) for forward, wherein the R-REF engine speed is set corresponding to the accelerator opening and the ratio control is conducted based on that speed. When the accelerator opening is reduced to approximately zero and the vehicle brake is applied simultaneously, the ratio control is executed on the basis of the EB-REF engine speed corresponding to the approximately zero accelerator opening.

In the ratio control referred to in the above embodiment, the speed reduction control is executed on the basis of the R-REF engine speed set corresponding to the accelerator opening of almost zero when the accelerator pedal is released without applying the vehicle brakes. The engine-brake force of this time is not so great. In a case like this, however, if the vehicle brake is additionally applied by depressing the brake pedal, an EB-REF engine speed which is higher than the R-REF engine speed of that time, is determined, and the speed reduction ratio control corresponding to the EB-REF engine speed will result in a greater engine brake force. On such an occasion, the brake capacity of the vehicle is increased and the brake distance may be shortened since the engine brake force is applied for braking the vehicle in addition to the vehicle brake thereof.

Figure 6:
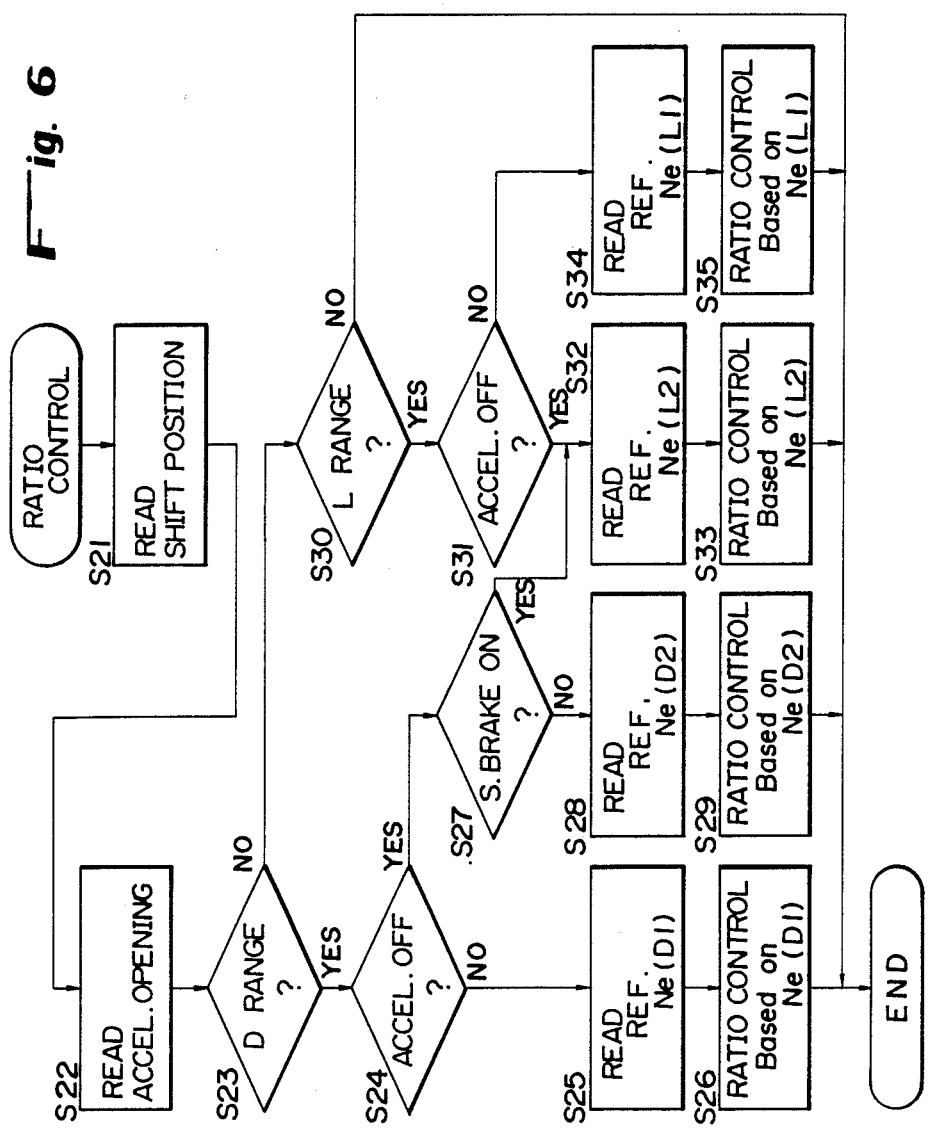

Next, the second embodiment relating to the speed reduction control by means of the controller 100 is described with the flow chart of FIG. 6.

When starting the vehicle with the shift lever positioned at "D", the first step is to depress the accelerator pedal for widening the accelerator opening to increase the engine speed. The controller 100 selects the D-range running mode, puts the clutch 5 in engagement, and then the engine speed is increased so as to coincide with the D-range R-REF engine speed Ne(D1), which corresponds to the accelerator opening, thereby accelerating the vehicle (S25 and S26). As shown in the chart of the FIG. 5, the control is executed in the sequence of: L1 (connection of the main clutch) to L2 (increasing the vehicle speed by increasing the engine speed at the maximum speed reduction ratio) to L3 (acceleration by decreasing the speed reduction ratio while keeping the actual engine speed in agreement with the D-range R-REF engine speed) to L4 (acceleration of the vehicle by increasing the engine speed at the minimum speed reduction ratio).

When running a vehicle with the shift lever positioned in the "L" range, the control is executed with the controller 100 selecting an L-range running mode, setting the L-range R-REF engine speed Ne(L1) corresponding to the accelerator opening, and controlling speed reduction ratio so that the actual engine speed coincides with the L-range R-REF engine speed Ne(L1) (S34, S35). The chart of FIG. 5 illustrates the sequence of the vehicle speed and the engine speed changes in the following order: L5 (connection of the main clutch) to L2 (acceleration of the vehicle by increasing the engine speed at the maximum speed reduction ratio) to L6 (acceleration by decreasing the speed reduction ratio while keeping the actual engine speed in agreement with the D-range R-REF engine speed) to L4 (acceleration of the vehicle by increasing engine speed).

Thus, the ratio control is executed in response to the accelerator opening in the D and L-ranges in the identical manner as shown in the first embodiment if the accelerator pedal in depressed.

Figure 7:
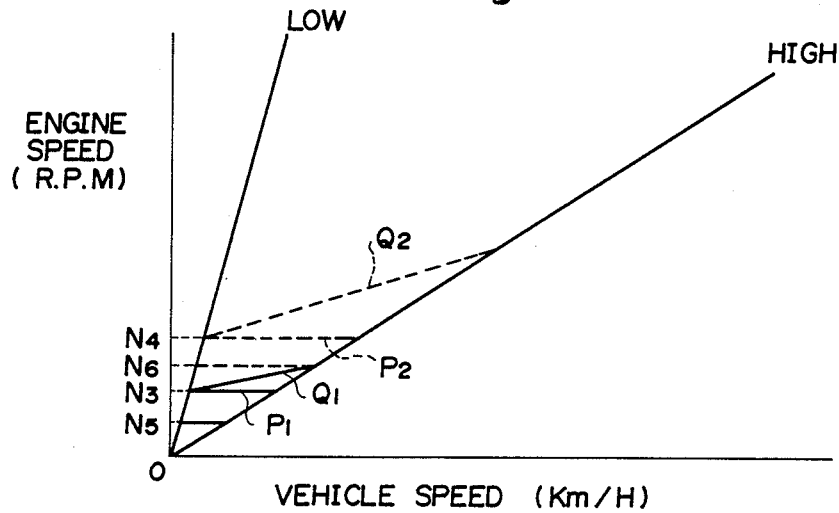

FIG. 7 illustrates a ratio control effected by releasing the accelerator pedal to substantially close the accelerator opening while the vehicle is running.

With the accelerator opening being substantially closed, the corresponding R-REF engine speed at the D and L-ranges are, respectively, N5 and N6. the speed reduction control (S29 and S33) is effected by setting the EB-REF engine speed N3 (equal to Ne(D2)) and N4 the D and L-ranges respectively, as the solid line P1 and the dashed line P2 represent them respectively, and by controlling the speed reduction ratio so that the actual engine speed coincides with the EB-REF engine speed. The EB-REF engine speeds N3 and N4 are, respectively, higher than the corresponding R-REF engine speeds N5 and N6, and consequently provide a great engine brake force upon decelerating while running with the accelerator opening being substantially closed. Since the EB-REF engine speed N4 in the L-range is set higher than the EB-REF engine speed N3 in the D-range, the L-range engine-brake force in deceleration with the approximately zero accelerator opening is greater than that of the D-range.

In deceleration with the shift lever set in the D-range and the approximately zero accelerator opening, the depression of the brake pedal to activate the vehicle brake makes the speed reduction ratio control to proceed to S32, with the shift lever still in the D-range, where the controller 100 selects the L-range mode to effect ratio control in accordance with the L-range engine-brake mode.

In other words, when the accelerator opening is substantially closed while running in the D-range, though the R-REF engine speed corresponding to the accelerator opening of approximately zero is N5, the reference engine speed becomes N3 (solid line P1) since the mode is switched to the D-range engine brake mode. When the vehicle brake is additionally applied, the mode is shifted to the L-range engine brake mode to change the reference engine speed to N4 (dashed line P2). Therefore, when the accelerator pedal is released and the brake pedal is depressed while running in the D-range, an engine brake force as great as that being obtainable at the L-range engine brake mode is provided to reduce the brake distance.

While in the embodiments described above the reference engine speeds in the D and L-range are set at specific values of N3 and N4 respectively, it is also possible to set the EB-REF engine speed corresponding to the vehicle speed. For example, as represented by the solid line Q1 and the dashed line Q2 in FIG. 7, the D-range EB-REF engine speed and the L-range EB-REF engine speed may be set at a value increasing with increase of the vehicle speed.

It is also possible to set both the running mode and the engine brake mode only in the D-range, while setting only the running mode in the L-range. The D-range engine brake mode is selected when the accelerator opening is substantially closed while running in the D-range. When the vehicle brake is additionally applied, the mode is switched to the L-range mode where the speed reduction control is executed based on the reference engine speed corresponding to the approximately zero accelerator opening in the L-range running mode. The reference engine speed with the approximately zero accelerator opening will be value shown in the solid line P1 or Q1, and when the vehicle brake is applied, the reference engine speed will become N6 to increase the engine-brake force.

Thus, the speed reduction ratio control provides a deceleration with a little engine brake function when the accelerator pedal is released to close the accelerator opening substantially without applying vehicle brake during running in the D-range. However, when the brake pedal is depressed, in addition to the previous state, to actuate the vehicle brake, the mode is switched to either the L-range mode or the L-range engine brake mode while the shift position is left in the D-range. Consequently, the greater engine brake force is provided according to either of the modes, and the combination of the engine-brake force and the vehicle-brake force will shorten the vehicle brake distance.

The third embodiment of the speed reduction control by means of the controller 100 is to be described in the flow charts of FIGS. 8 and 9.

In this control, at first, the vehicle speed is input S41, and then the reference speed reduction ratio R (S42) corresponding to the vehicle speed at that time is determined using a table in which the corresponding reference ratios to the vehicle speed are set. This table arranges the speed reduction ratio which may provide the engine brake force ordinarily required to decelerate a vehicle while running, for instance, on a flat road.

Then, a correction value (OFFSET) of the speed reduction ratio is calculated (S43) in accordance with the brake pedal operation by the driver. This calculation is made according to the subroutine shown in FIG. 9. The subroutine starts at a judgment of whether the engine brake is activated or not (S45). This judgment is made based on the detection of, for instance whether the accelerator opening (namely the degree of the accelerator pedal depression or of the engine throttle opening) is substantially closed to effect the deceleration. If the engine brake is not effected, the control FIG. 8 is not effected. In such case, the correction value (OFFSET) shall be reset at zero (S49).

If the engine brake is being effected, judgment will be made whether as to the vehicle brake is being applied or not, namely, whether the driver is depressing the brake pedal or not (S46). When the vehicle brake is not applied, the correction value will be held as it is and the flow is terminated.

If the vehicle brake is being applied, the detection will be made as to whether such action has lasted for a duration of $T_1$ or not (S47), and when the $T_1$ has elapsed, the memorized correction value (OFFSET) is corrected by adding an incremental value "a" to it (S48).

The subroutine shown in FIG. 9 is repeated at predetermined intervals (10 ms, for instance) whereby the correction value (OFFSET) is rectified by addition of the incremental value "a" for every $T_1$ time as long as the vehicle brake is being applied. Even when the vehicle brake is not being applied, the correction value is maintained as long as the engine brake is effected. Therefore, when the vehicle brake is applied next time, the maintained correction value will be corrected by adding the incremental value as every $T_1$ time elapses. Namely, the correction value (OFFSET) is rectified corresponding to a total actuation time of the vehicle brake, and when the accelerator pedal is again depressed canceling the engine brake, the correction value (OFFSET) is reset to zero.

When the correction value (OFFSET) is calculated, the control will return to the flow shown in FIG. 8, and the reference speed reduction ratio R is corrected by adding the correction value (OFFSET) to it (S44). Thereupon, the controller 100 outputs suitable duty ratio signals to the solenoid valves 151 and 152 to control the speed reduction ratio of the continuously variable speed transmission so as to coincide with the corrected reference speed reduction ratio.

Thus when decelerating the vehicle by effecting the engine brake, the ratio control is executed by increasing speed reduction ratio corresponding to the vehicle brake activating time which reflects the driver's desire to reduce the vehicle speed.

Consequently, when the driver demands a stronger deceleration by depressing the brake pedal, the engine brake force can be increased, or the engine brake effect corresponding to the deceleration demand of the driver may be generated.

The above embodiments refer to continuously variable speed transmissions comprising hydraulic pumps and motors, but the control method of this invention is not limited to such continuously variable speed transmissions, and may be applied to other types of continuously variable speed transmission. Also the control device of the speed reduction ratio may not only be the electrohydraulic system whereby the electrical controller activates the solenoid valves which in turn operate the servo units such as shown in this instance, but may also be systems directly controlling the speed reduction ratio by an electric motor and the like.

While the embodiment illustrated the control method whereby the speed reduction ratio is used as direct reference value corresponding to the operating time of the vehicle brake, another controlling method whereby the reference engine speed is set as the reference value, and the reference engine speed is increased corresponding to the length of the operating time of the vehicle brake to increase the speed reduction ratio may also be used.

Thus, it is assumed that the longer the vehicle brake operating time (the time during which the brake pedal is being depressed) is, the stronger is the driver's desire to reduce the speed. The embodied controlling method is so arranged that, while the deceleration is being executed making use of the engine brake effect, the speed reduction ratio at that time may be rectified upward in response to the cumulative vehicle brake operating time of the vehicle driver, and thus the engine brake force very close to the deceleration demands becomes available.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of controlling speed reduction ratio in a continuously variable speed transmission which comprises the steps of determining a R-REF (running reference) engine speed corresponding to an accelerator opening, and controlling the speed reduction ratio so that an actual engine speed coincides with said R-REF engine speed;

the improvement comprising the steps of:
determining an EB-REF (engine-brake reference) engine speed which is higher than said R-REF engine speed corresponding to the accelerator opening when the accelerator opening is substantially closed and a vehicle brake is applied simultaneously, and controlling the speed reduction ratio so that the actual engine speed coincides with said EB-REF engine speed.

2. A method of controlling speed reduction ratio as defined in claim 1, wherein said R-REF engine speed includes a D-range R-REF engine speed set for a D-range and a L-range R-REF engine speed set for the L-range which is higher than said D-range R-REF engine speed, the L-range R-REF engine speed corresponding to the accelerator opening of approximately zero is used as the EB-REF engine speed when the accelerator opening is substantially closed and the vehicle brake is applied simultaneously during running in the D-range, and the speed reduction ratio is so controlled that the actual engine speed coincides with said L-range R-REF engine speed.

3. A method of controlling speed reduction ratio as defined in claim 1 or 2, wherein said EB-REF engine speed is determined in correspondence with a vehicle speed.

4. A method of controlling speed reduction ratio in a continuously variable speed transmission based on either one of predefined modes, said predefined modes comprising;
- (A-1) a D-range running mode, which is chosen in a D-range position of a shift lever with an accelerator opening being opened, wherein the speed reduction ratio is so controlled that an actual engine speed coincides with a D-range R-REF engine speed corresponding to said accelerator opening;
- (A-2) a D-range engine-brake mode, which is chosen in the D-range position of the shift lever with the accelerator opening being substantially closed, the speed reduction ratio being so controlled that the actual engine speed coincides with a D-range EB-REF engine speed which is higher than said D-range R-REF engine speed;
- (B) a L-range mode, which is chosen in a L-range position of the shift lever, the speed reduction ratio being so controlled that the actual engine speed coincides with a L-range reference engine speed, which is higher than said D-range R-REF engine speed and is set to correspond with the accelerator opening;

wherein, when the shift lever is positioned in the "D" range while the accelerator opening is substantially closed and the vehicle brake is applied, the L-range mode will be selected irrespective of the shift position, and the speed reduction ratio will be controlled based on the L-range mode.

5. A method of controlling speed reduction ratio as defined in claim 4, wherein said L-range mode includes,
- (B-1) a L-range running mode, which is chosen in a L-range position of the shift lever with the accelerator opening being opened, wherein the speed reduction ratio is so controlled that the actual engine speed coincides with a L-range R-REF engine speed, which is higher than said D-range R-REF engine speed; and
- (B-2) a L-range engine-brake mode, which is chosen in the L-range position with the accelerator opening being substantially closed, wherein the speed reduction ratio is so controlled that actual engine speed coincides with a L-range EB-REF engine speed, which is higher than said L-range R-REF engine speed;

and when the accelerator opening is substantially closed and the vehicle brake is applied with the shift lever positioned in the "D" range, the L-range engine-brake mode is selected and the speed reduction ratio is controlled based on the L-range engine-brake mode.

6. A method of controlling speed reduction ratio as defined in claim 4 or 5, wherein said EB-REF engine speed is determined in correspondence with a vehicle speed.

7. A method of controlling speed reduction ratio in continuously variable speed transmission which comprises the steps of:

cumulatively calculating vehicle brake operating time while a vehicle is decelerated with an accelerator opening substantially closed to utilize an engine brake effect, and correcting the speed reduction ratio to increase the engine brake effect corresponding to said cumulative time, so that the longer the driver applies the vehicle brake, the greater the engine brake effect is.

8. A method of controlling speed reduction ratio in continuously variable speed transmission as defined in claim 7;

which comprises the steps of:

determining a EB-REF engine speed when a vehicle is decelerated with an accelerator opening substantially closed;

correcting said EB-REF engine speed so as to increase in correspondence with cumulative time of vehicle brake application when the vehicle brake is additionally applied; and controlling the speed reduction ratio so that actual engine speed coincides with said EB-REF engine speed.

* * * * *